US007679578B2

(12) United States Patent
Schedivy

(10) Patent No.: US 7,679,578 B2
(45) Date of Patent: *Mar. 16, 2010

(54) HEADREST MOUNTABLE VIDEO SYSTEM

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/688,611

(22) Filed: Oct. 17, 2003

(65) Prior Publication Data

US 2004/0227696 A1    Nov. 18, 2004

Related U.S. Application Data

(63) Continuation-in-part of application No. 10/438,724, filed on May 15, 2003, now Pat. No. 7,245,274.

(51) Int. Cl.
*G09G 5/00* (2006.01)

(52) U.S. Cl. .......................... 345/7; 348/837; 296/37.15

(58) Field of Classification Search ..................... 345/7; 296/37.1, 37.15, 37.16, 37.7, 37.8; 297/217.3; 348/837–839; 361/686, 688; 248/918, 919, 248/921, 923; 312/248; 224/281, 311, 261
See application file for complete search history.

(56) References Cited

U.S. PATENT DOCUMENTS

| 3,019,050 | A | | 1/1962 | Spielman | |
|---|---|---|---|---|---|
| 4,647,980 | A | | 3/1987 | Steventon et al. | |
| 4,681,366 | A | | 7/1987 | Lobanoff | ............ 297/191 |
| 4,702,519 | A | | 10/1987 | Lobanoff | |
| 4,756,528 | A | | 7/1988 | Umashankar | ............ 273/1 |
| 4,836,478 | A | | 6/1989 | Sweere | |
| 4,843,477 | A | | 6/1989 | Mizutani et al. | ............ 358/248 |
| 4,982,996 | A | * | 1/1991 | Vottero-Fin et al. | ...... 297/217.3 |
| 5,021,922 | A | | 6/1991 | Davis et al. | |
| 5,214,514 | A | * | 5/1993 | Haberkern | ............ 348/838 |
| 5,255,214 | A | | 10/1993 | Ma | ............ 361/680 |
| 5,267,775 | A | | 12/1993 | Nguyen | |
| 5,396,340 | A | * | 3/1995 | Ishii et al. | ............ 348/838 |
| 5,410,447 | A | | 4/1995 | Miyagawa et al. | ........ 361/681 |
| 5,507,556 | A | | 4/1996 | Dixon | |
| 5,555,466 | A | | 9/1996 | Scribner et al. | ............ 348/8 |

(Continued)

FOREIGN PATENT DOCUMENTS

FR    2817812    *    6/2002

(Continued)

OTHER PUBLICATIONS

International Search Report from Corresponding PCT Application No. PCT/US2004/34371.

(Continued)

*Primary Examiner*—Regina Liang
(74) *Attorney, Agent, or Firm*—F. Chau & Associates, LLC

(57) ABSTRACT

A video system comprises a base portion mounted in a vehicle seat headrest, and a door pivotally attached to the base portion, wherein the door includes a display and a media player mounted to the door. The media player may be one of a slot-type device and a clamshell-type device.

18 Claims, 20 Drawing Sheets

U.S. PATENT DOCUMENTS

| | | | |
|---|---|---|---|
| 5,610,822 A | 3/1997 | Murphy | |
| 5,667,179 A | 9/1997 | Rosen | |
| 5,793,413 A | 8/1998 | Hylton et al. | |
| 5,796,575 A | 8/1998 | Podwalny et al. | |
| 5,842,715 A | 12/1998 | Jones | |
| 5,949,345 A | 9/1999 | Beckert et al. | 340/815.41 |
| 6,081,420 A | 6/2000 | Kim et al. | 361/681 |
| 6,102,476 A * | 8/2000 | May et al. | 297/217.3 |
| 6,134,223 A | 10/2000 | Burke et al. | |
| D438,853 S | 3/2001 | Iino | D14/136 |
| 6,199,810 B1 | 3/2001 | Wu et al. | |
| 6,216,927 B1 | 4/2001 | Meritt | |
| 6,266,236 B1 | 7/2001 | Ku et al. | 361/681 |
| 6,292,236 B1 | 9/2001 | Rosen | 348/837 |
| 6,300,880 B1 | 10/2001 | Sitnik | |
| 6,301,367 B1 | 10/2001 | Boyden et al. | |
| 6,317,039 B1 | 11/2001 | Thomason | |
| 6,337,913 B1 | 1/2002 | Chang | |
| 6,339,455 B1 * | 1/2002 | Allan et al. | 348/837 |
| 6,380,978 B1 | 4/2002 | Adams et al. | |
| 6,409,242 B1 | 6/2002 | Chang | 296/37.7 |
| 6,419,379 B1 | 7/2002 | Hulse | |
| 6,443,574 B1 | 9/2002 | Howell et al. | |
| 6,587,127 B1 | 7/2003 | Leeke et al. | |
| 6,666,492 B1 | 12/2003 | Schmidt et al. | |
| 6,669,285 B1 | 12/2003 | Park et al. | 297/217.3 |
| 6,719,343 B2 | 4/2004 | Emerling et al. | 296/24.34 |
| 6,724,317 B1 | 4/2004 | Kitano et al. | 340/691.1 |
| 6,739,654 B1 | 5/2004 | Shen et al. | |
| 6,871,356 B2 * | 3/2005 | Chang | 348/837 |
| 6,899,365 B2 * | 5/2005 | Lavelle et al. | 296/37.15 |
| D515,522 S | 2/2006 | Vitito | D14/126 |
| 7,036,879 B2 | 5/2006 | Chang | |
| 7,044,546 B2 | 5/2006 | Chang | 297/217.3 |
| 7,084,932 B1 | 8/2006 | Mathias et al. | |
| 2001/0001083 A1 | 5/2001 | Helot | 439/131 |
| 2002/0159270 A1 | 10/2002 | Lynam et al. | |
| 2002/0186531 A1 | 12/2002 | Pokharna et al. | 361/687 |
| 2003/0021086 A1 | 1/2003 | Landry et al. | 361/683 |
| 2003/0042378 A1 | 3/2003 | Imamura et al. | |
| 2003/0057749 A1 | 3/2003 | Buono | |
| 2003/0117728 A1 | 6/2003 | Hutzel et al. | |
| 2003/0137584 A1 | 7/2003 | Norvell et al. | 348/61 |
| 2003/0184137 A1 | 10/2003 | Jost | 297/219.1 |
| 2003/0198008 A1 | 10/2003 | Leapman et al. | 361/681 |
| 2003/0229897 A1 | 12/2003 | Frisco et al. | |
| 2004/0130616 A1 * | 7/2004 | Tseng | |
| 2006/0109388 A1 | 5/2006 | Sanders et al. | |
| 2006/0112144 A1 * | 5/2006 | Ireton | |

FOREIGN PATENT DOCUMENTS

| | | | |
|---|---|---|---|
| FR | 2 829 980 | | 3/2003 |
| JP | 2001-047921 | | 2/2001 |
| WO | WO 00/38951 | * | 7/2000 |
| WO | WO0038951 | | 7/2000 |
| WO | WO 02/074577 | A1 | 9/2002 |
| WO | WO 03/029050 | A1 | 4/2003 |

OTHER PUBLICATIONS

Notice of Allowance and Fee(s) Due from corresponding U.S. Appl. No. 10/438,724, now U.S. Patent No. 7,245,274.

Office Action mailed Jan. 10, 2007 from corresponding U.S. Appl. No. 10/438,724, now U.S. Patent No. 7,245,274.

Office Action mailed Jun. 5, 2006 from corresponding U.S. Appl. No. 10/438,724, now U.S. Patent No. 7,245,274.

Office Action mailed Oct. 4, 2005 from corresponding U.S. Appl. No. 10/438,724, now U.S. Patent No. 7,245,274.

Office Action mailed Feb. 26, 2008 from U.S. Appl. No. 11/072,171.

Office Action mailed Sep. 12, 2008 from corresponding U.S. Appl. No. 11/072,171.

Office Action mailed Mar. 11, 2009 from corresponding U.S. Appl. No. 11/072,171.

International Search Report dated Jun. 6, 2007 for PCT Application No. PCT/US06/43432.

Office Action mail date Sep. 22, 2008 pertaining to U.S. Appl. No. 10/808,659.

Office Action mail date Jun. 22, 2009 pertaining to U.S. Appl. No. 11/557,177.

International Search Report dated Jun. 5, 2009 for PCT Application No. PCT/US200643300.

* cited by examiner

HEADREST MOUNTABLE VIDEO SYSTEM

CROSS-REFERENCE TO RELATED APPLICATION

This application is a Continuation-In-Part of U.S. application Ser. No. 10/438,724, filed on May 15, 2003 now U.S. Pat. No. 7,245,274.

BACKGROUND OF THE INVENTION

1. Technical Field

The present invention relates to a video system, and more particularly to a video system capable of being mounted in a headrest.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located away from the video screen, for example, in the glove box of the vehicle. The video player and video screen are not mounted together in the headrest and occupy more space in the vehicle than is necessary.

Therefore, a need exists for a video system, including a video screen and a video player capable of being mounted in a headrest.

SUMMARY OF THE INVENTION

A video system, in accordance with an embodiment of the present invention, includes a base portion mounted in a vehicle seat headrest, and a door pivotally attached to the base portion, wherein the door includes a display and a media player mounted to the door.

Another video system, in accordance with an embodiment of the present invention, includes a base portion mounted in a vehicle seat headrest, wherein the base portion includes a media player mounted in the base portion, and a door pivotally attached to the base portion, wherein the door includes a display mounted to the door.

The media player may be one of a slot-type device and a clamshell-type device, and the base portion is one of coupled to an internal headrest support structure and attached directly to the body of the headrest. The media player may include at least one of a DVD player, a CD-ROM player, a video game player, a videocassette player, a television tuner, a radio tuner, and a device capable of playing at least one of computerized video files and computerized audio files.

The video system may include a wireless transmitter for transmitting wireless signals, which may include at least one of an optical transmitting device and an antenna. The wireless transmitter may be capable of transmitting the wireless signals on more than one channel and the wireless signals may include at least one of audio signals and video signals and at least one of infrared (IR) signals and radio frequency (RF) signals.

The video system may include a port for connecting to an external device, and a cover for covering the display. The display may be mounted on a front side of the door and the media player may be mounted on a backside of the door. The door may pivot in a range of angles including approximately 0° to 180° with respect to the base portion, and may be pivotally attached to the base portion with a hinge, wherein the hinge is positioned at a top, bottom or side portion of the door.

The display and the media player may be capable of operating when the door is in a closed position, and a data storage medium may be inserted into the media player when the door is in an open position. The vehicle seat headrest may include at least one vent for dissipating heat and/or a fan. The base portion may include a cavity for selectively housing the media player.

Another video system, in accordance with an embodiment of the present invention, includes a display mounted in a vehicle seat headrest, and a media player mounted in the vehicle seat headrest, wherein the media player is connected to the display.

A base portion may be mounted in the vehicle seat headrest, and a door may be pivotally attached to the base portion, wherein the door includes the display and the media player mounted to the door. The base portion may include the media player mounted in the base portion, and the door may include the display mounted to the door.

The vehicle seat headrest may include an opening in line with a slot in the media player for receiving a data media to be inserted in the slot. The media player may be one of a slot-type device and a clamshell-type device. A wireless transmitter may be capable of transmitting at least one of video and audio signals to at least one of wireless headphones and a slave display.

The video system may further include a base portion mounted in the vehicle seat headrest, wherein the base portion includes a cavity for selectively housing the media player, and the display is pivotally attached to the base portion.

BRIEF DESCRIPTION OF THE DRAWINGS

Preferred embodiments of the present invention will be described below in more detail, with reference to the accompanying drawings.

DETAILED DESCRIPTION OF THE PREFERRED EMBODIMENTS

Figure 1:
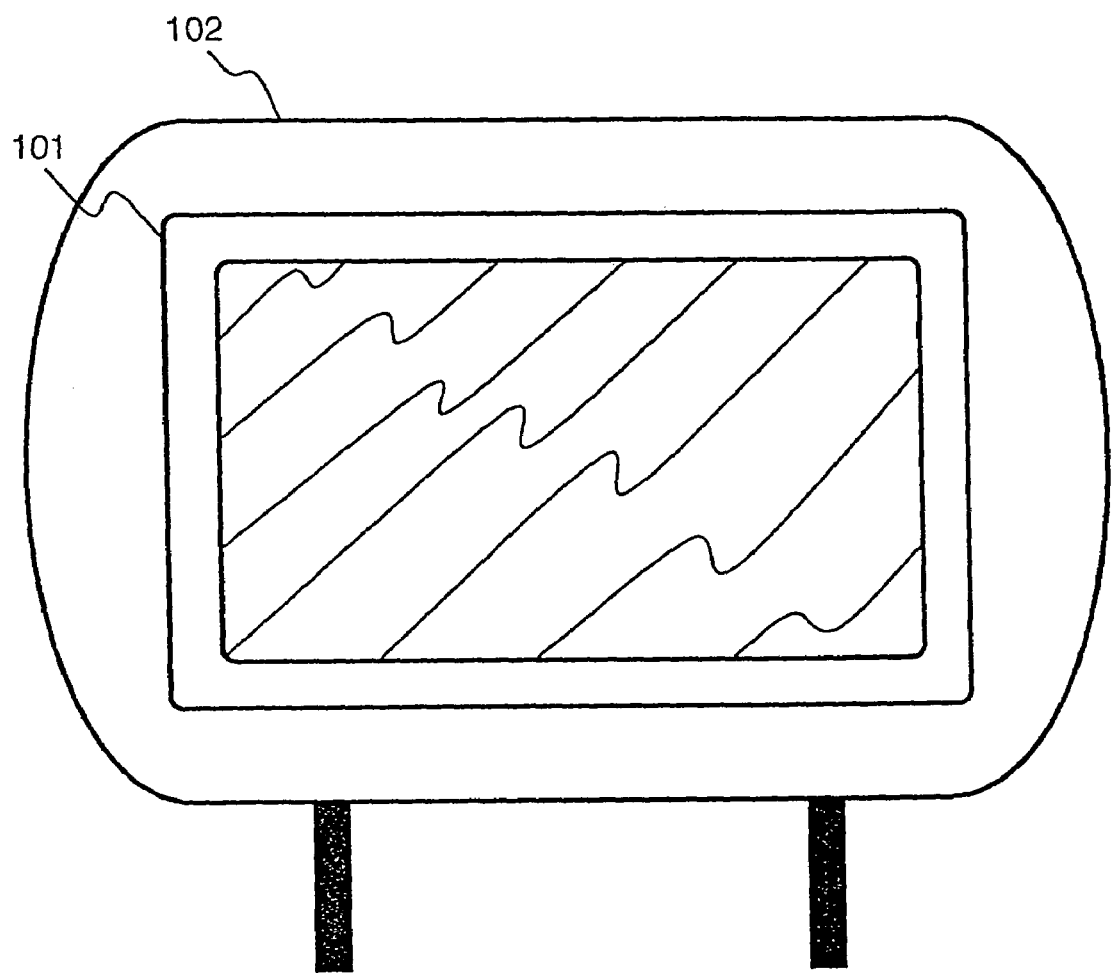
FIG. 1 is an illustration of a video screen installed in a vehicle headrest.
Figure 2:
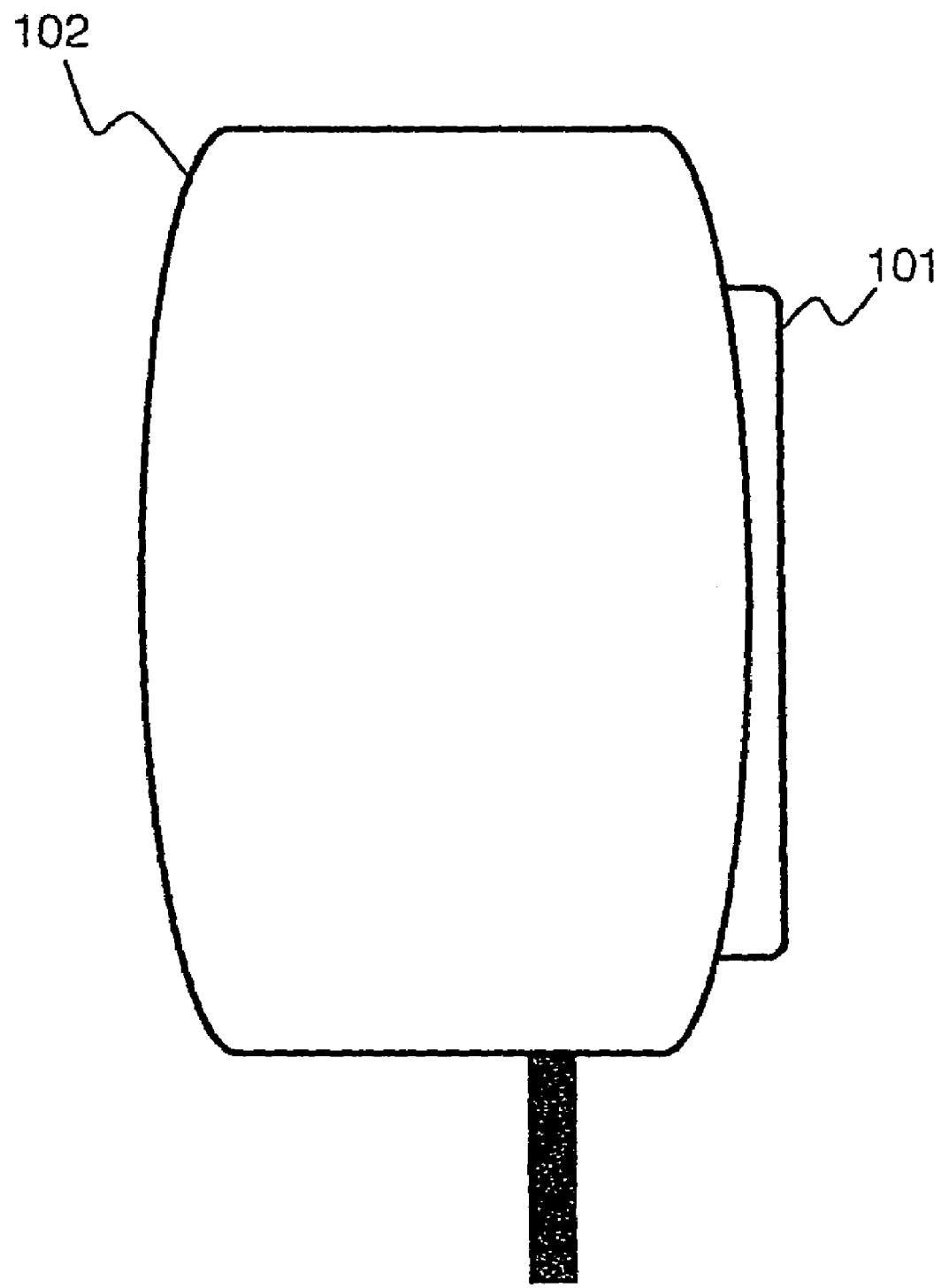
FIG. 2 is an illustration of a video screen installed in a vehicle headrest.
Figure 3A:
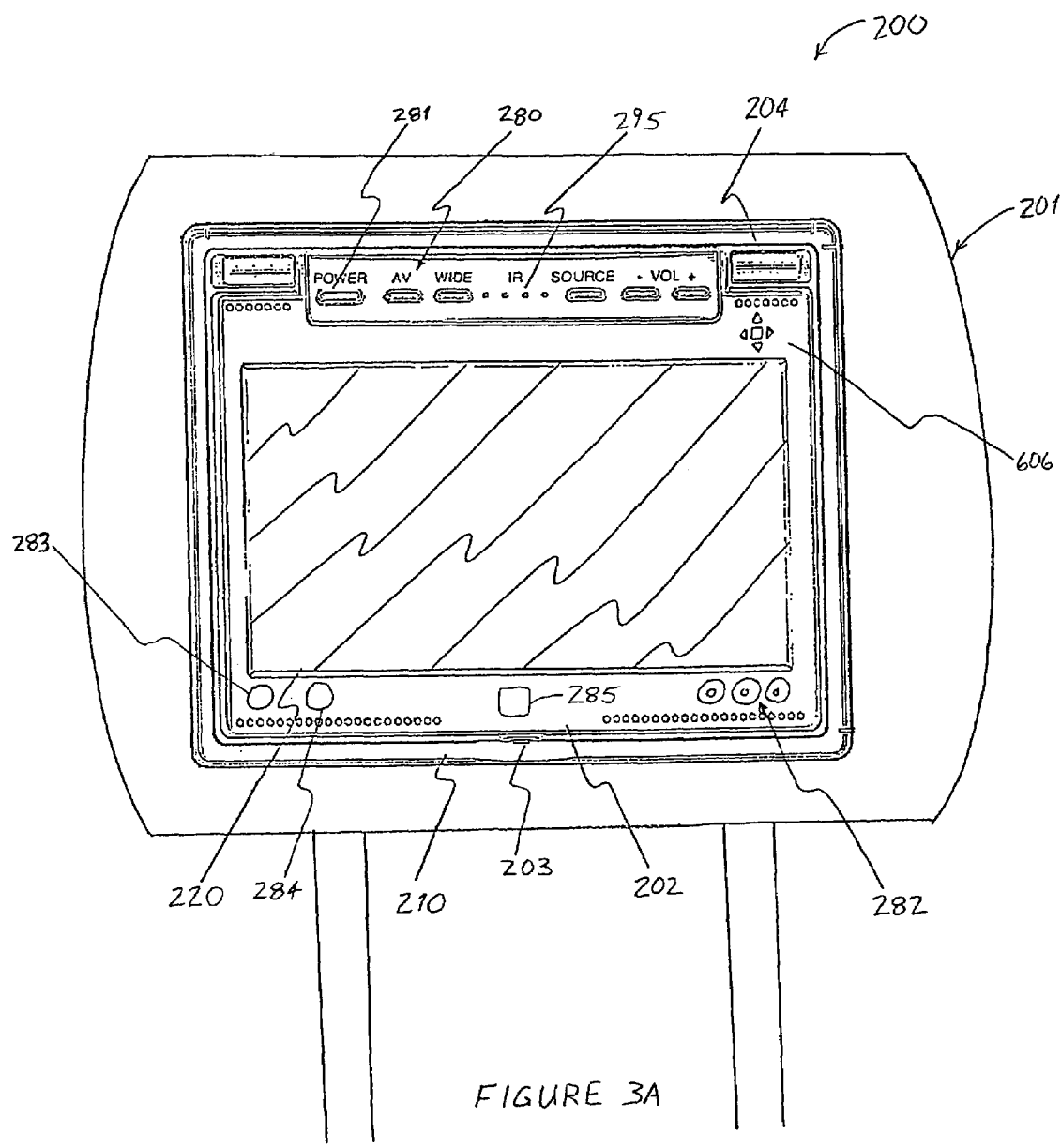
FIGS. 3A-3C show a display and a media player installed in a vehicle headrest according to an embodiment of the present invention.
Figure 3B:
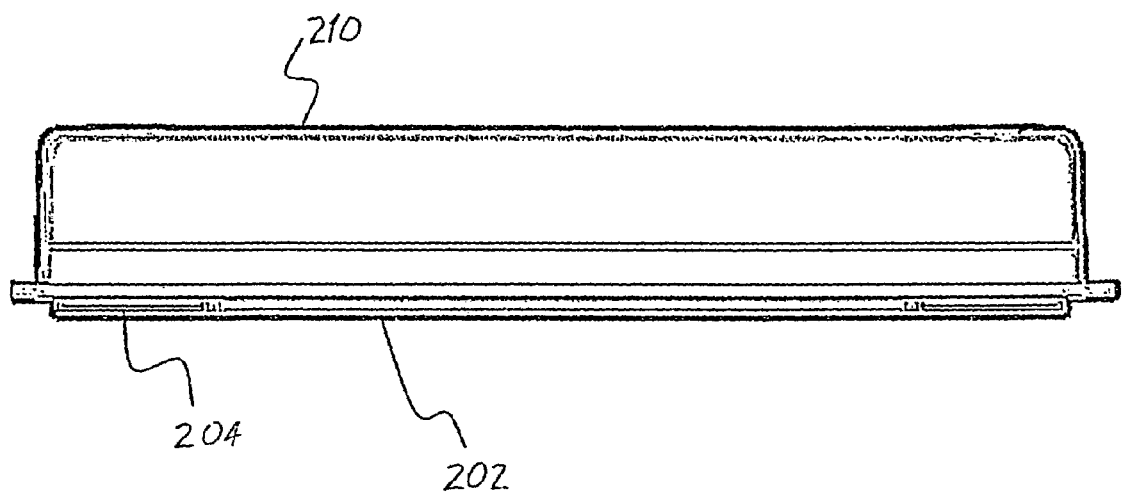
Figure 3C:
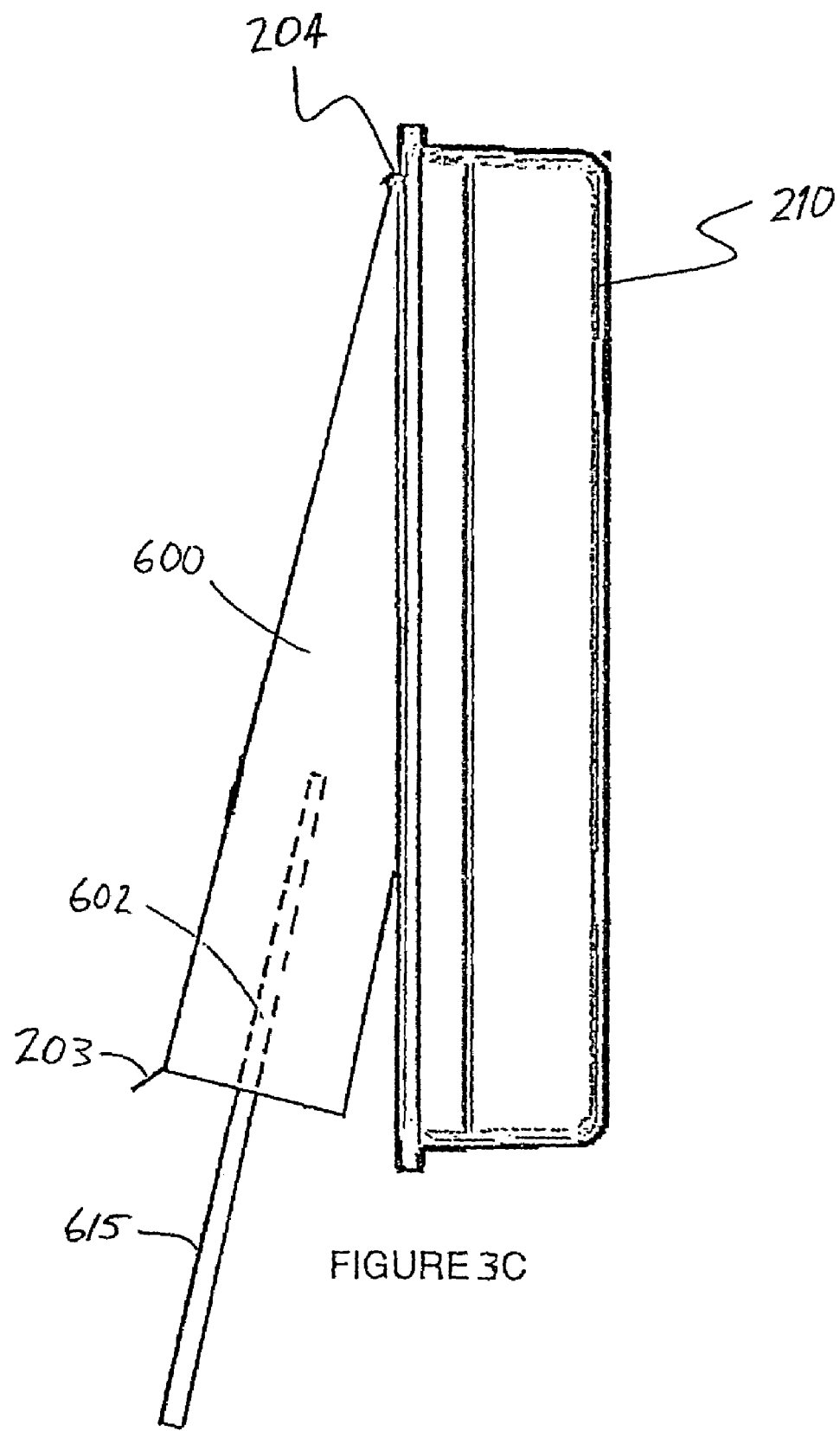
Figure 4A:
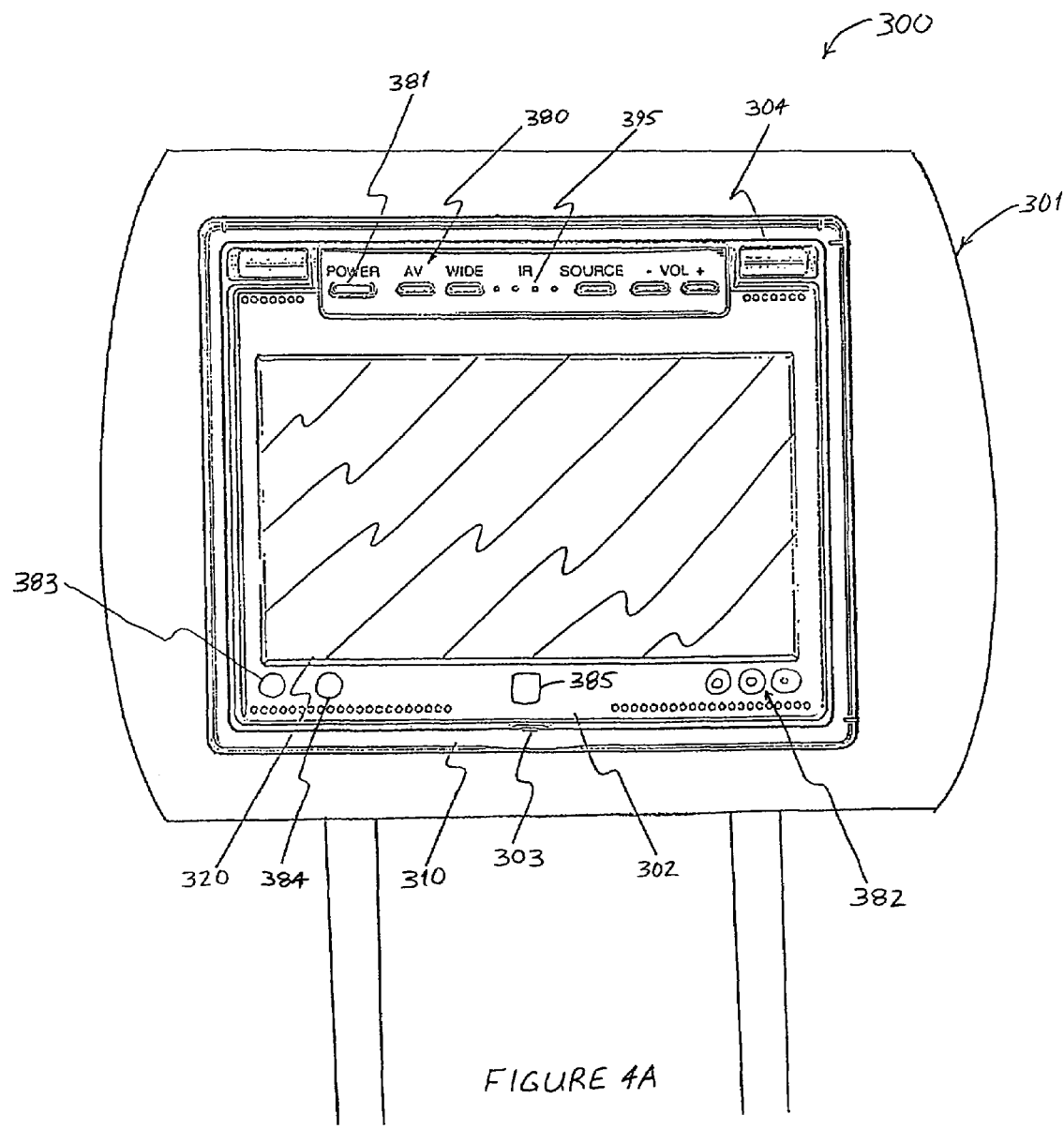
FIGS. 4A-4E show a display and a media player installed in a vehicle headrest according to an embodiment of the present invention.
Figure 4B:
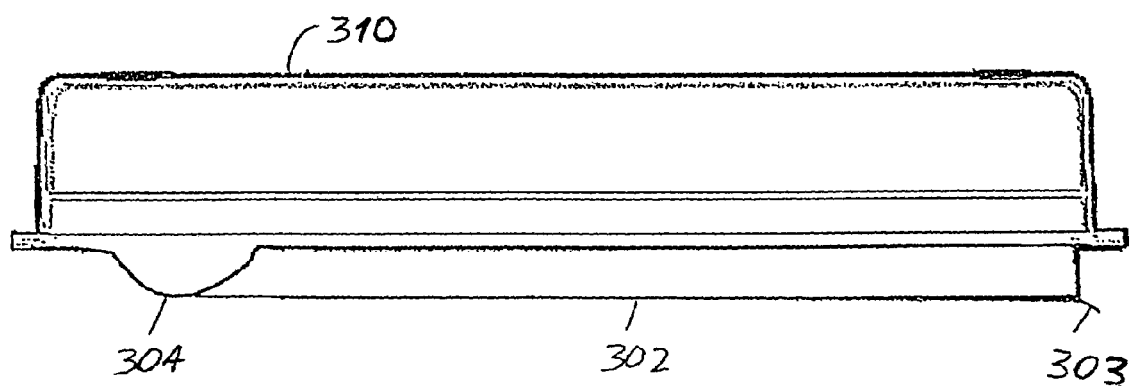
Figure 4C:
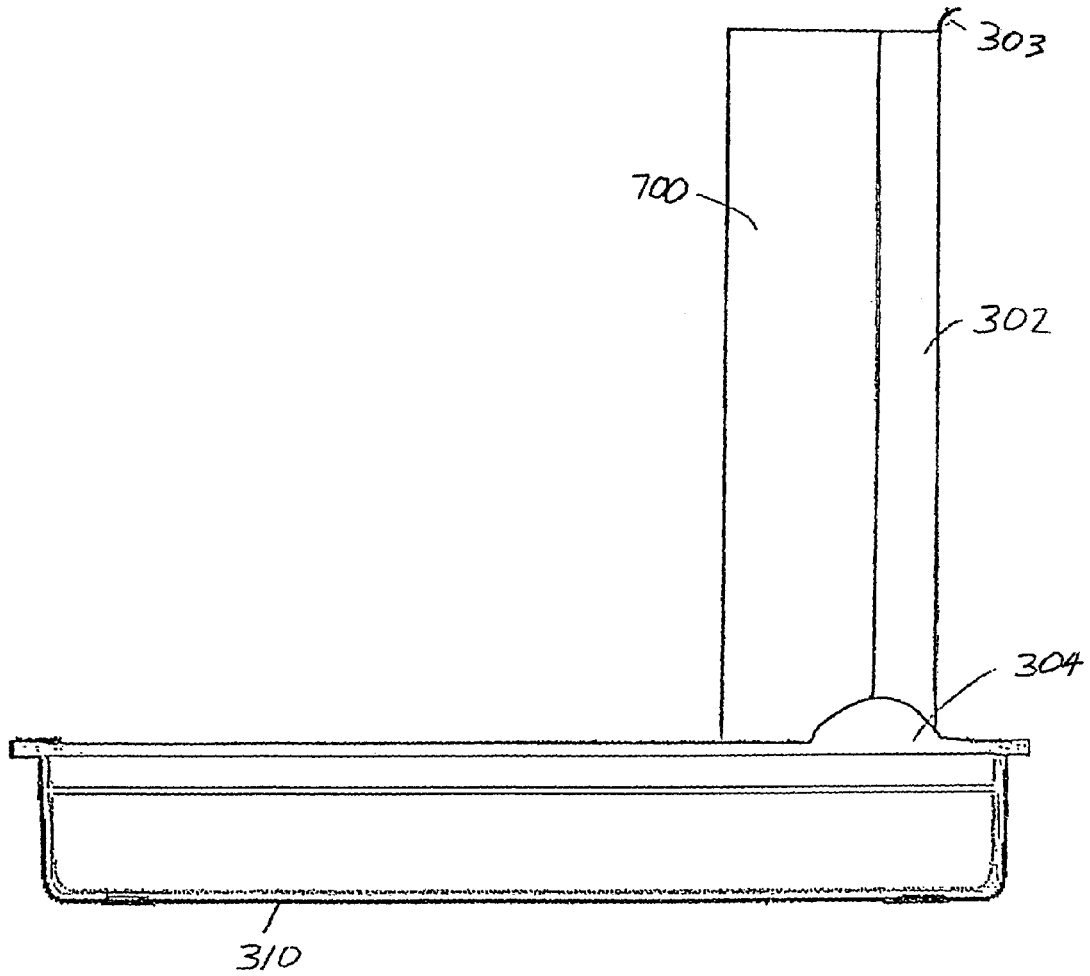
Figure 4D:
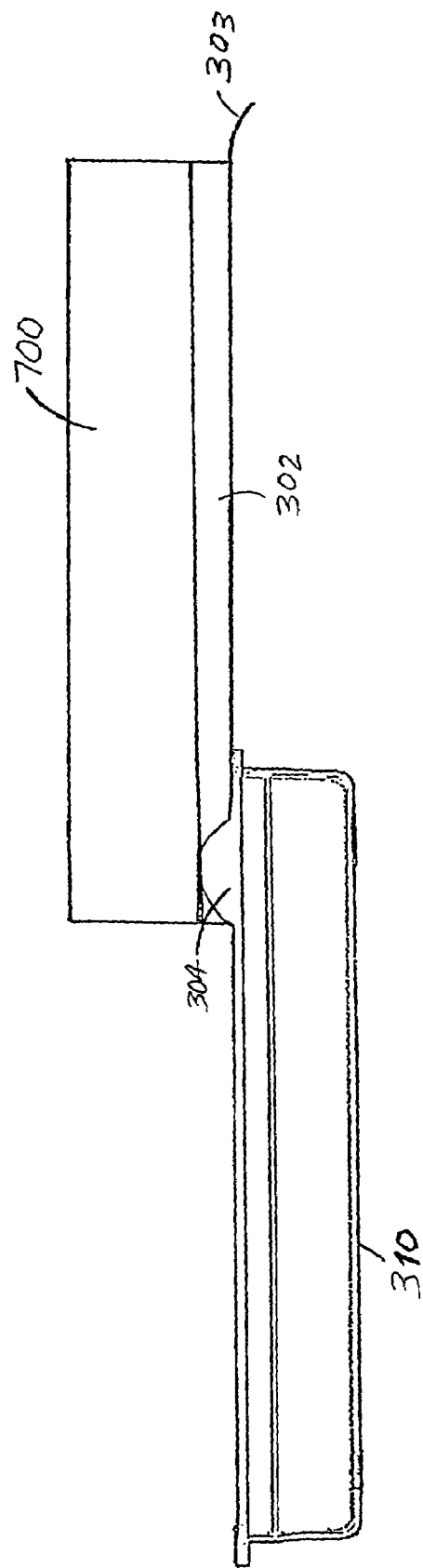
Figure 4E:
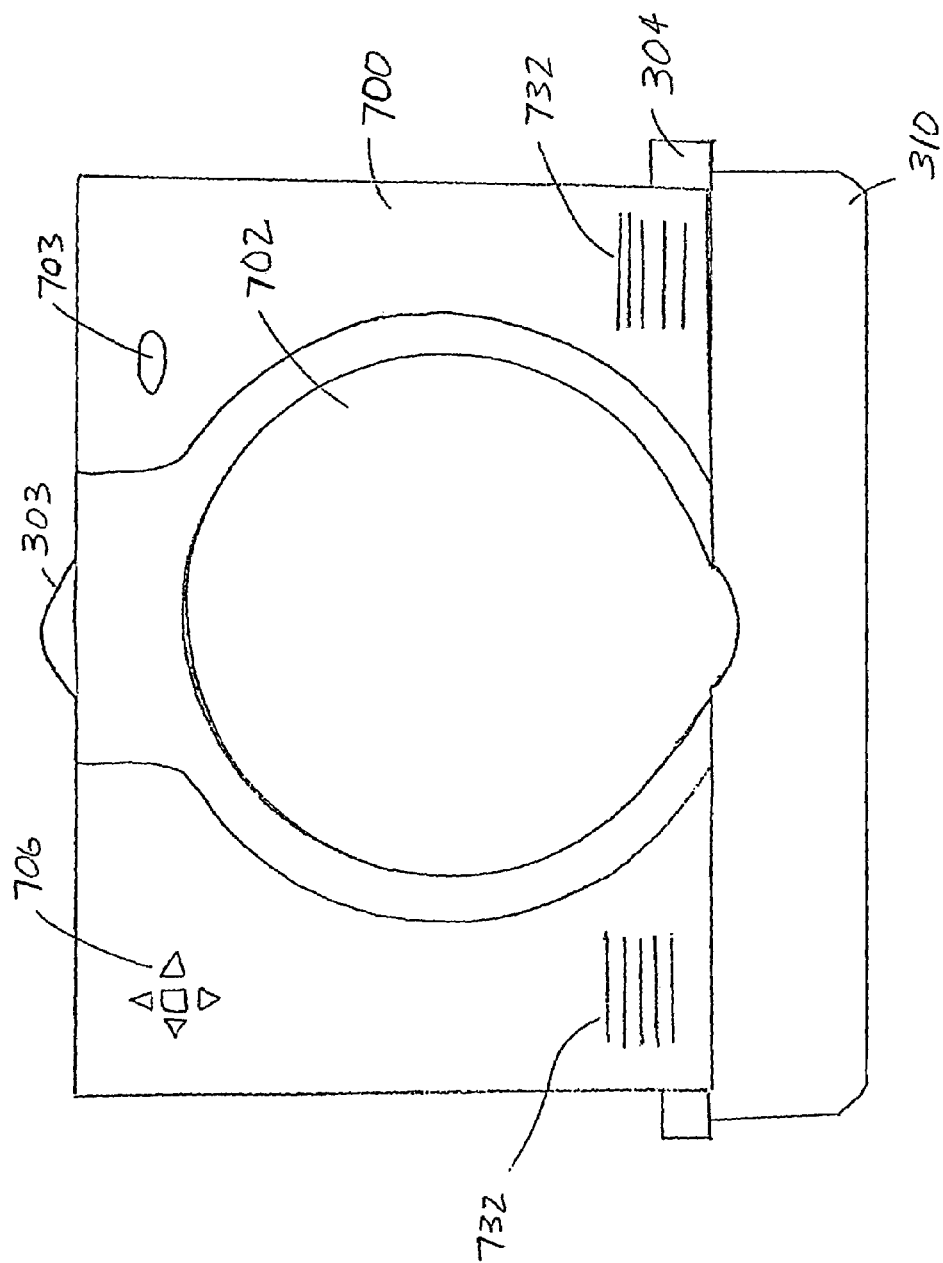
Figure 7A:
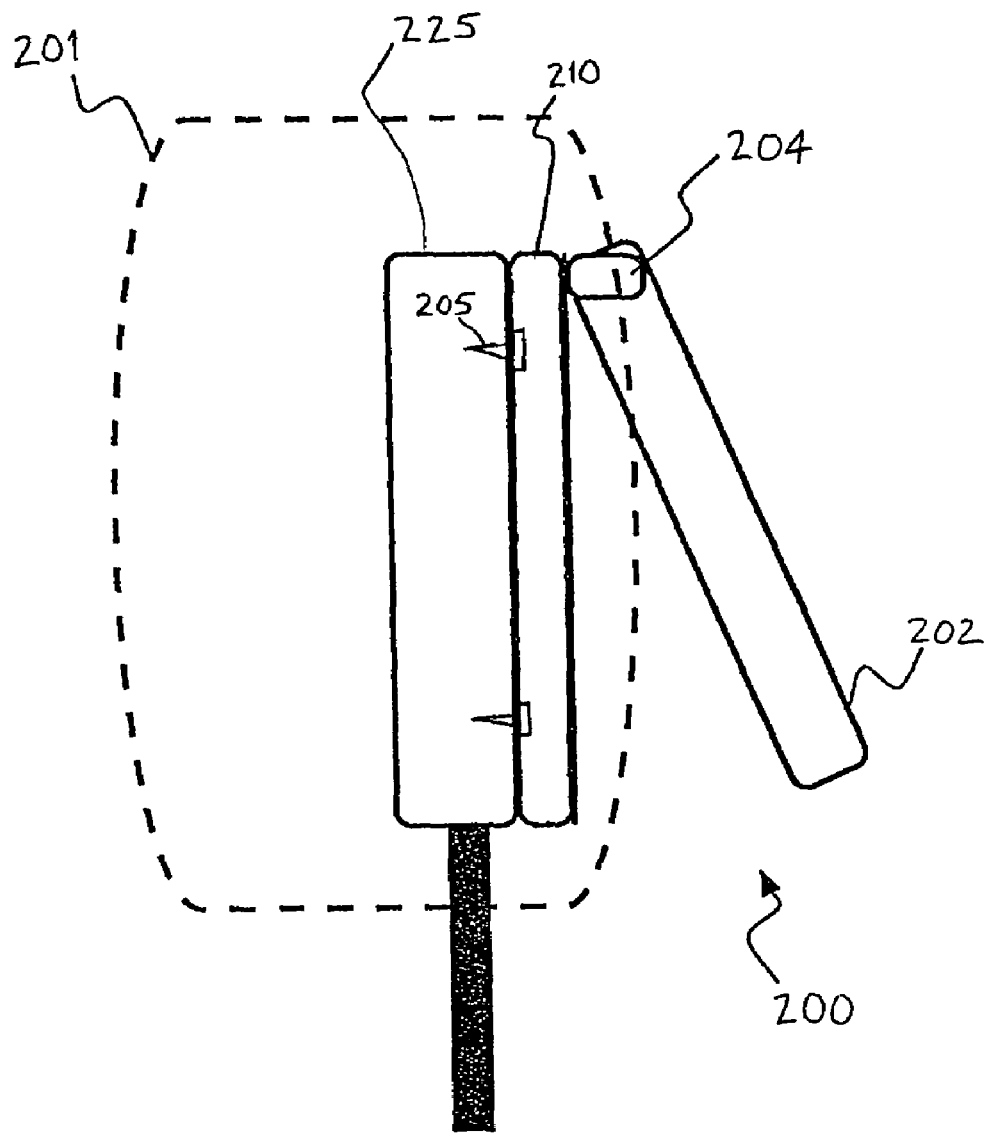
FIGS. 7A-7C show mechanisms for installing the video system to a vehicle headrest according to an embodiment of the present invention.
Figure 7B:
Figure 7C:
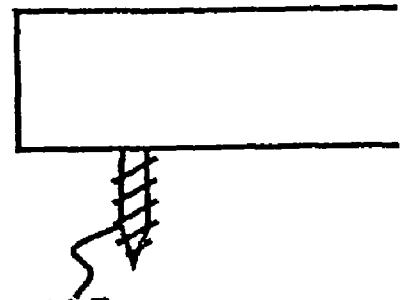

Referring to FIGS. 3A-3C, the video system 200 mounted in a headrest 201 includes a door 202 is connected via a hinge or hinges 204 to a base portion 210. The door 202 includes an entertainment unit 600 and a display 220 formed on opposite sides thereof. The entertainment unit 600 and other entertainment units described herein may include, for example, a DVD player, a CD-ROM player, a video game player, a videocassette player (VCP), a television or radio tuner, an MP3 player or similar device capable of downloading and playing computerized video and/or audio files, or any combination of the above media sources. A connection between the display 220 and the entertainment unit 600 may be achieved through appropriately positioned openings in the door 202. Alternatively, the door 202 may consist of an open center section surrounded by a frame, wherein the display 220, including the entertainment unit 600 coupled to its rear, snugly fits into the open center section bordered by the frame. The display 220 and the entertainment unit 600 can be fixed to the door 202 by, for example, screws, catches, adhesives, molding, pressure fitting and/or any other means known to those skilled in the art. Similarly, as shown in FIGS. 7A-7C, the base portion 210 can be fixed to the headrest 201 by, for example, screws 205, catches 206, adhesives, epoxies and/or any other means known to those skilled in the art. As shown in FIG. 7A, the base portion is secured in the headrest 201, and more particularly to an internal headrest support structure 225. As an alternative to mounting to an internal headrest support structure, the base portion may be attached (e.g., glued or riveted) directly to the body of the headrest.

The hinge 204, located at a top portion of the door 202, allows the door 202 to pivot away from the base portion 210 to expose a slot 602 in the slot-type entertainment device 600 for receiving a data media 615, such as a DVD. The hinge 204 may be positioned at top, side or bottom portions of the door 202, and depending on the location of the hinge 204, the slot 602 may be positioned at top, side or bottom portions of the entertainment device 600. The door 202 may be opened, for example, by pulling a tab 203 and/or by depressing a button (not shown) releasing the door 202 from the base portion 210. The door 202 may be closed by re-engaging the released side of the door 202 with the base portion 210. A desired program can be played for viewing while the door 202 is in the closed position.

The display 220 has a thin display screen, preferably an LCD type screen, for displaying video information. A control panel 280 on the display 220 includes control buttons 281 for controlling the on screen display characteristics.

The display 220 may include input and output ports. For example, audio/video input/output ports 282, a headphone port 283, a power port 284 and an IR port 285 for transmitting and/or receiving, for example, remote control signals. It should be understood that other port types can be provided, for example, a USB port or RCA jack for connecting to a game controller or headphones. The ports can be positioned at any convenient location on the video system 200, for example, on a bottom portion, a top portion, or a side portion of the video system 200.

A speaker (not shown) for presenting audio information in connection with a video program being played can be mounted in the headrest 201, or to the door 202, base portion 210, the display 220, or the entertainment unit 600. Alternatively, audio may be provided to vehicle occupants through the existing vehicle audio system.

To provide for audio reception through wireless headphones, the display 220 may include a wireless transmitter 295 for transmitting wireless signals to wireless receivers in wireless headphones. The wireless signals may include radio frequency signals for use with, for example, Bluetooth® wireless systems or infrared (IR) signals for use with, for example, Whitefire® systems. It is preferred that the wireless transmitter 295 has the capability to transmit wireless signals over more than one channel operating at a different frequency for each channel. The use of more than one channel, for example, avoids interference between more than one wireless headphone user watching different programs on different displays. Wireless signals also may be encoded to prevent interference between wireless headphones. Such encoding may be based on, for example, spread spectrum technology. The wireless transmitter 295 can include an optical transmitting device (e.g., an LED, a laser, and so forth) and an antenna for wireless transmission of IR signals and RF signals, respectively.

The video system 200 can be connected to a vehicle's power supply, e.g., 12 Volts, through a wiring harness. The video system 200 can also be connected to a vehicle's data communication bus, which carries data to and from the external devices. Thus, the video system 200 can be connected to external devices including, for example, a slave video display unit installed in another headrest, a security system, and a vehicle sound system.

Controls 606 for controlling functions of the entertainment device 600, such as, volume, previous, next, pause, eject, play and power on/off may be positioned on the door 202, display 220, and/or the entertainment device 600. The controls 606 can be, for example, buttons, switches, a touch sensitive liquid crystal display and the like.

FIGS. 4A-4E show another embodiment of a video system 300 installed in a headrest 301, wherein an entertainment unit 700 is integrated into the headrest 301 along with the display 320.

As shown in FIGS. 4A-4E, a door 302 is connected via a hinge or hinges 304 to the base portion 310. The door 302 includes the display 320 and the entertainment unit 700 formed on opposites sides thereof, like the door 202 and the entertainment unit 600 of the previously described embodiment. The display 320 and the entertainment unit 700 can be fixed to the door 302 and the base portion 310 can be fixed to the headrest 301 by the same or similar means to those previously described in connection with the headrest 201.

The hinge 304, located at a top portion of the door 302, allows the door 302 to pivot 180° away from the base portion 310 to expose a cover 702 of a clamshell-type entertainment device 700 that can be opened to allow insertion of a data media, such as a DVD, into the entertainment device 700. A hinge 304 that allows the door 302 to pivot more or less than 180° can be used provided that easy opening of the cover 702 and subsequent insertion or removal of a data media from the entertainment unit 700 can be achieved. The hinge 304 may be positioned at top, side or bottom portions of the door 302. The door 302 may be opened, for example, by pulling a tab 303. As an alternative to the tab 303, a button (not shown) may be depressed releasing the door 302 from the base portion 310. The cover 702 may be opened, for example, by pulling a tab (not shown) and/or by depressing a button 703 releasing the cover 702 from the entertainment unit 700. The door 302 may be closed by re-engaging the released side of the door 302 with the base portion 310. A desired program can be played for viewing while the door 302 is in the closed position.

Like the display 220 of the previously described embodiment, the display 320 has a thin display screen, preferably an LCD type screen, and may include a control panel 380 with control buttons 381 for controlling the on screen display characteristics.

Like the wireless transmitter 295 and the input/output ports 282-285 described above, a wireless transmitter 395 and input/output ports 382-385 may be positioned at any convenient location on the door 302, the display 320 or the base portion 310. Also, audio may be provided to vehicle occupants through the existing vehicle audio system or through a speaker mounted in the headrest 301 or entertainment unit 700, or to the door 302, base portion 310 or display 320. For example, speakers 732 are shown mounted in the entertainment unit 700. Like the video system 200 described above, the video system 300 also may be connected to a vehicle's power supply and to external devices.

Further, like the controls 606, controls 706 for controlling functions of the entertainment device 700, may be positioned on the door 302, display 320, and/or the entertainment device 700.

FIGS. 5A-5D show another embodiment of a video system 400 installed in a headrest 401, wherein an entertainment unit 800 is integrated into the headrest 401 along with the display 420.

As shown in FIGS. 5A-5D, a door 402 is connected via a hinge or hinges 404 to the base portion 410. The door 402 includes the display 420 formed on a front side thereof. The display 420 can be fixed to the door 402 by, for example, screws, catches, adhesives, molding, pressure fitting, snugly fitting into an open center section of the door 402 bordered by a frame and/or any other means known to those skilled in the art. The base portion 410 can be fixed to the headrest 401 by the same or similar means to those previously described in connection with other embodiments.

The hinge 404, located at a top portion of the door 402, allows the door 402 to pivot away from the base portion 410 to expose a clamshell-type entertainment device 800 positioned in the base portion 410. The entertainment device 800 can be fixed to the base portion 410 by any acceptable means known to those skilled in the art, such as by screws, catches, adhesives, molding and pressure fitting. The entertainment unit 800 may also be selectively housed in the base portion 410 so that it is replaceable with a different entertainment unit operating with the same or a different type of media.

The entertainment device 800 includes a cover 802 that can be opened to allow insertion of a data media, such as a DVD, into the entertainment device 800. The hinge 404 may be positioned at top, side or bottom portions of the door 402. The door 402 may be opened, for example, by pulling a tab 403. Alternatively, a button (not shown) may be depressed releasing the door 402 from the base portion 410. The cover 802 may be opened, for example, by pulling a tab (not shown) and/or by depressing a button 803 releasing the cover 802 from the entertainment unit 800. The door 402 may be closed by re-engaging the released side of the door 402 with the base portion 410. A desired program can be played for viewing while the door 402 is in the closed position.

Like the displays 220 and 320 of the previously described embodiments, the display 420 has a thin display screen, preferably an LCD type screen, and may include a control panel 480 with control buttons 481 for controlling the on screen display characteristics.

Like the wireless transmitter 295 and the input/output ports 282-285 described above, a wireless transmitter 495 and input/output ports 482-485 may be positioned at any convenient location on the door 402, the display 420 or the base portion 410. Also, audio may be provided to vehicle occupants through the existing vehicle audio system or through a speaker mounted in the headrest 401 or entertainment unit 800, or to the door 402, base portion 410 or display 420. Like the video system 200 described above, the video system 400 also may be connected to a vehicle's power supply and to external devices.

Figure 5A:
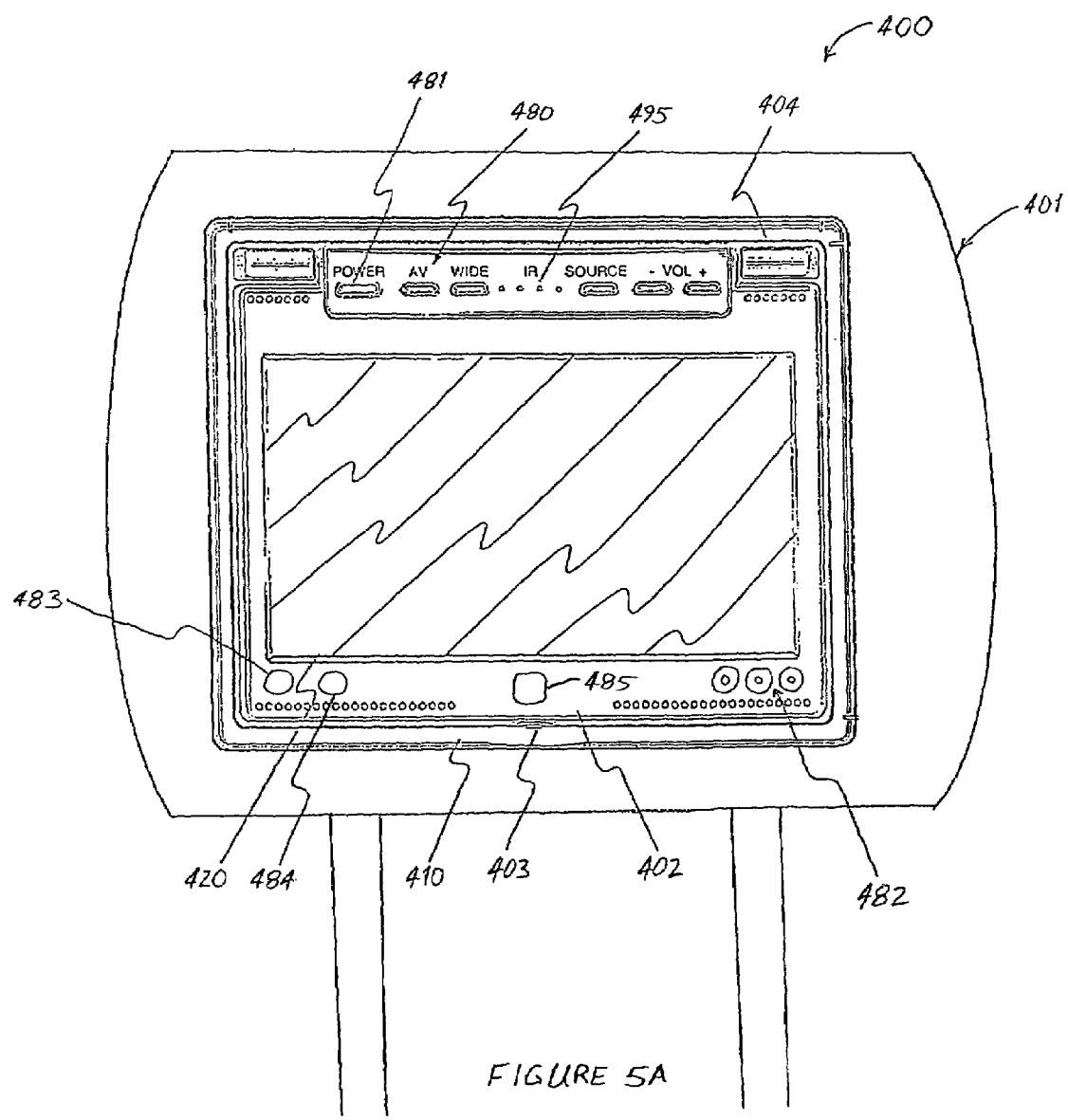
FIGS. 5A-5D show a display and a media player installed in a vehicle headrest according to an embodiment of the present invention.
Figure 5B:
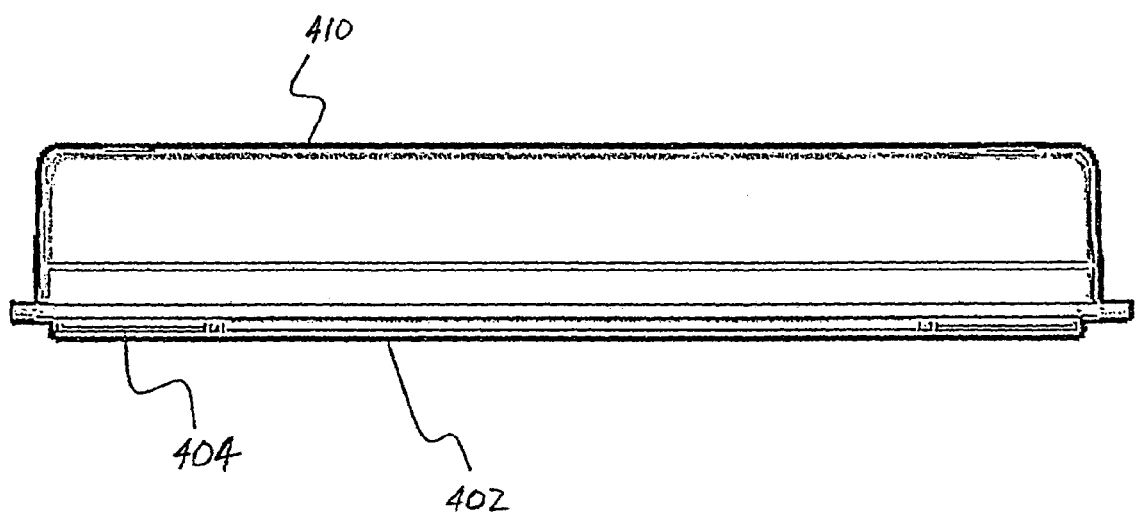
Figure 5C:
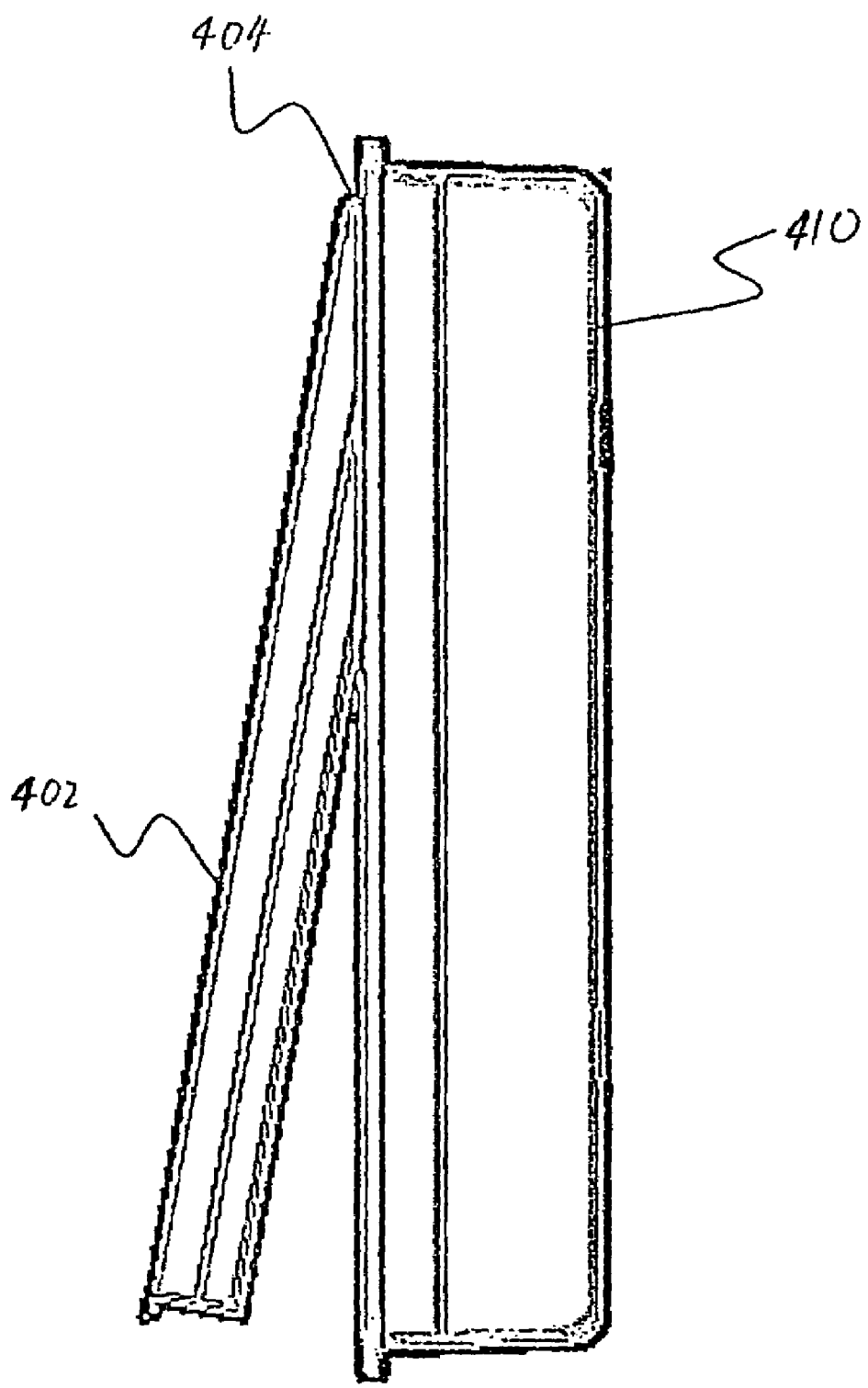
Figure 5D:
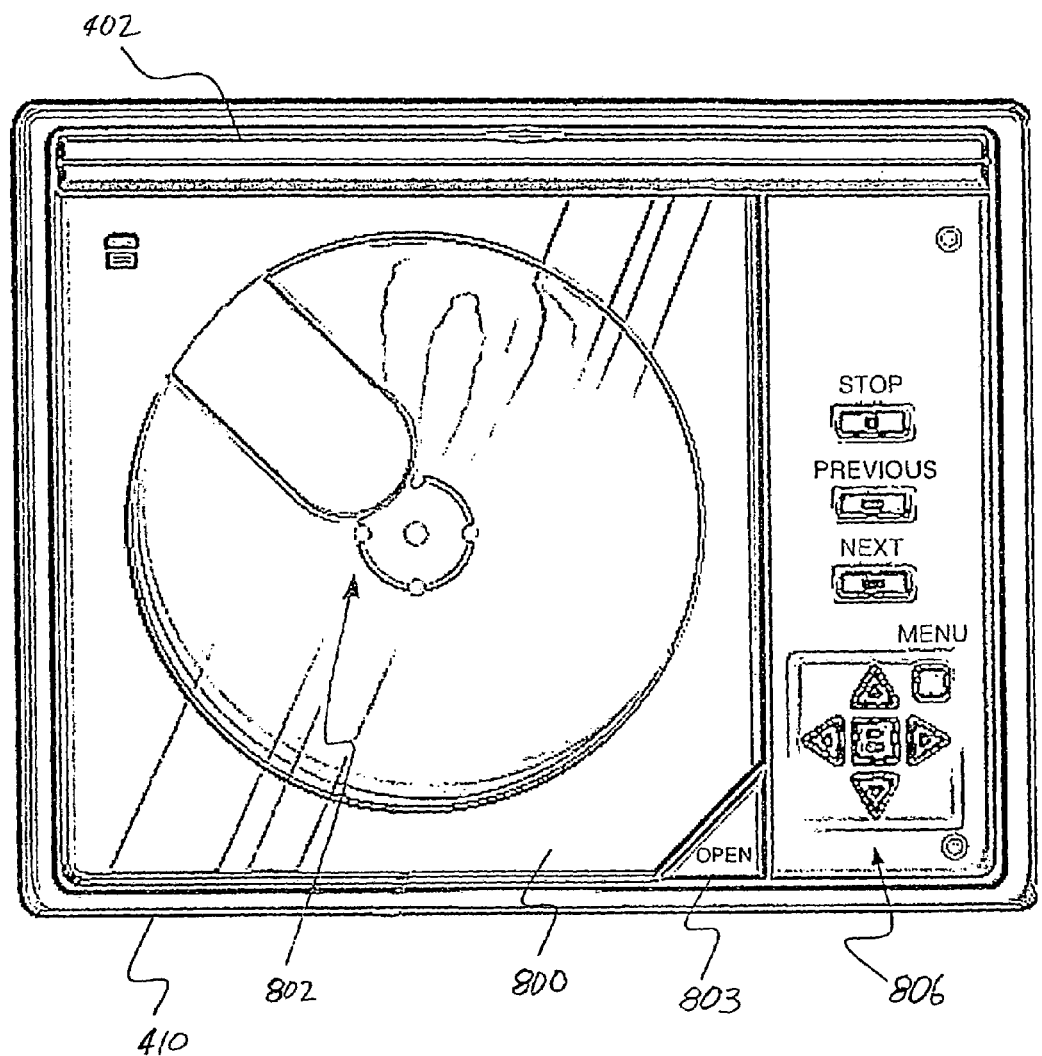

Further, like the controls 606, controls 806 for controlling functions of the entertainment device 800, may be positioned on the door 402, display 420, and/or the entertainment device 800. For example, controls 806 are shown in FIG. 5D positioned on the entertainment device 800.

Figure 6:
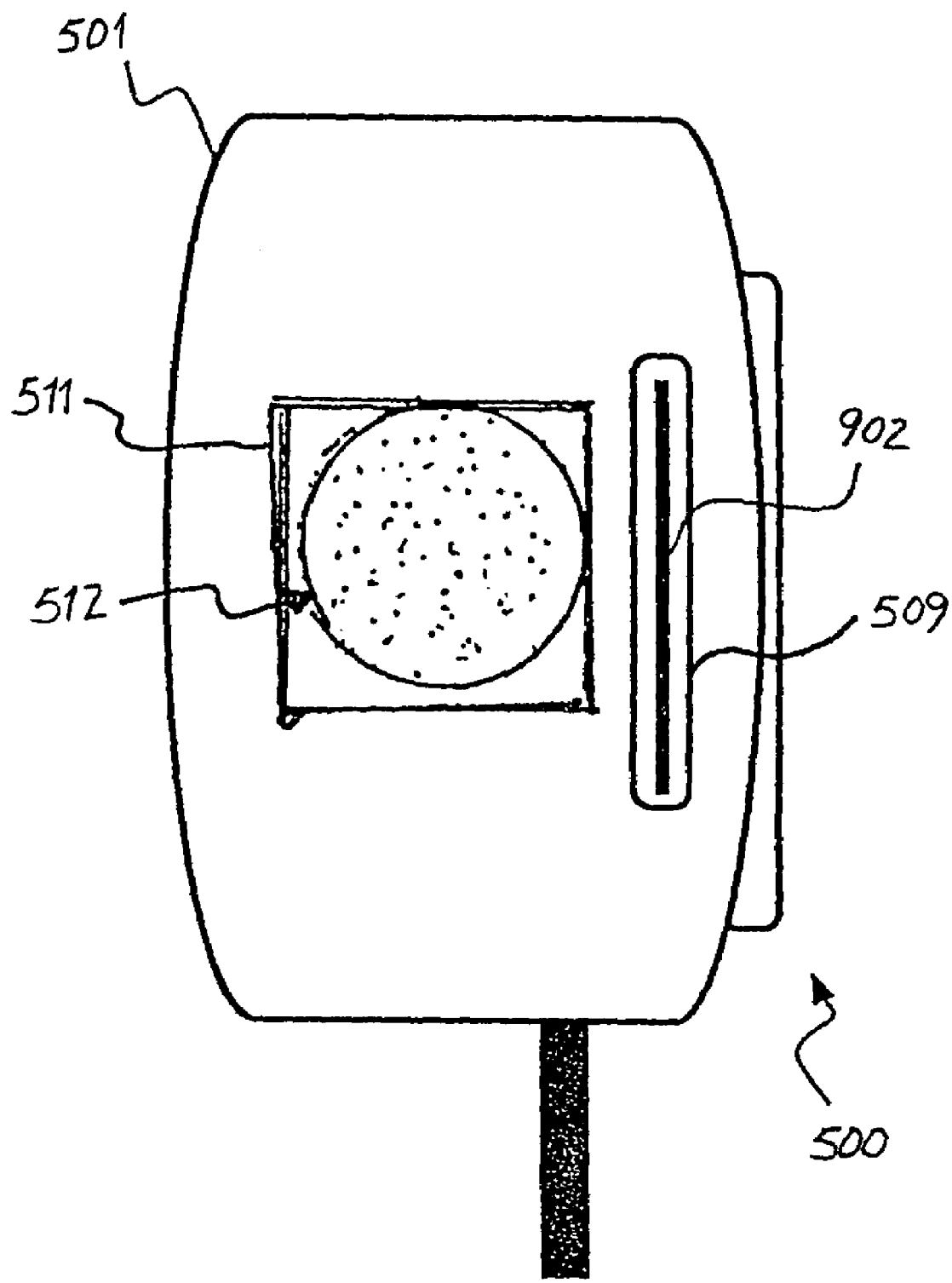
FIG. 6 shows a video system according to an embodiment of the present invention.

Referring to FIG. 6, in another embodiment of a video system 500 installed in a headrest 501, the headrest 501 can comprise an opening 509 for receiving a data media into the video system 500. The headrest opening 509 aligns with the slot 902 of an entertainment device (not shown) of the video system 500 to allow data media, such as a DVD or MP3 disk to be inserted from the side, top, or bottom of the headrest 501. The headrest 501 further comprises vents 512 for dissipating heat. A cooling fan 511 for increasing airflow can also be added within the headrest 501. The cooling fan 511 can be located in the headrest 501 and behind the vents 512, such that the cooling fan 511 is concealed.

Figure 8:
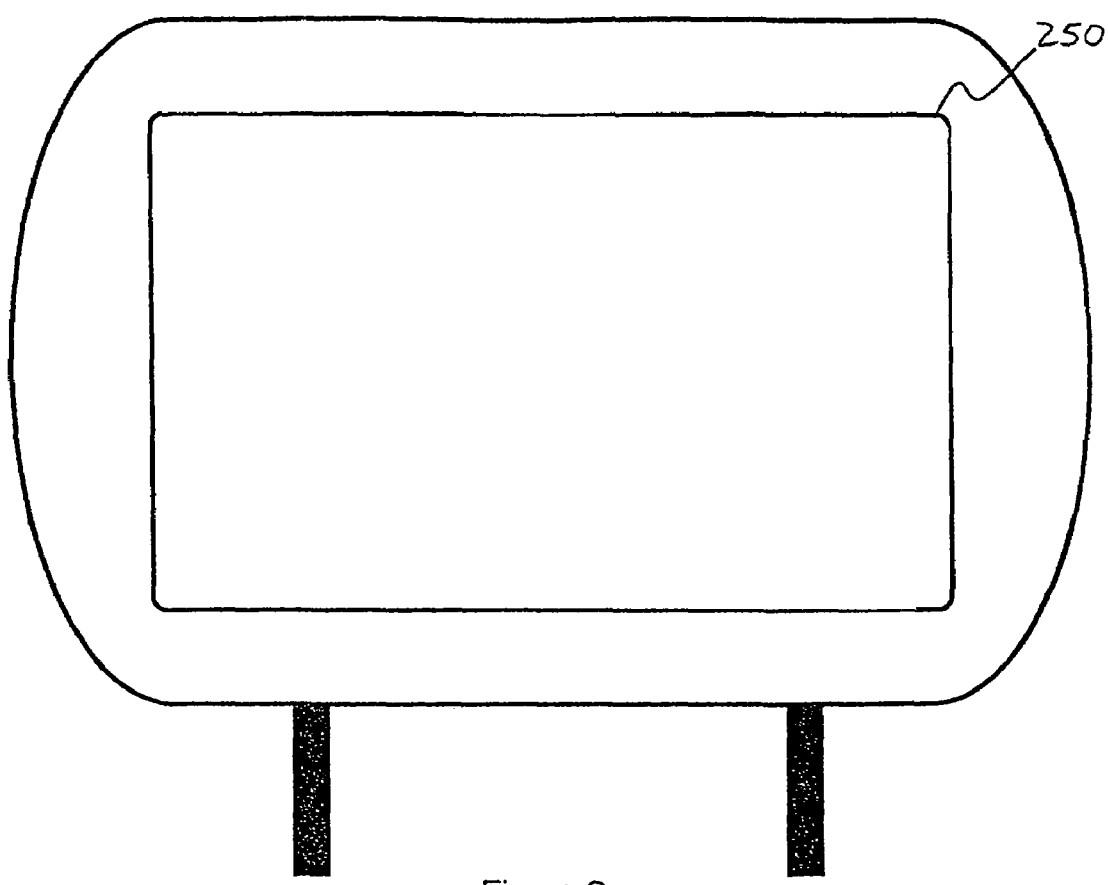
FIG. 8 shows a cover for the video system according to an embodiment of the present invention.

When the video system is not in use, a cover 250 can conceal the video system, as shown in FIG. 8. The cover 250 is manufactured from a material such as, plastic, wood, leather, vinyl, cloth, and/or aluminum. Depending on the cover material, the cover 250 can be secured by latches, catches, snaps, Velcro, and/or a zipper. The cover 250 may include openings for receiving latches and the like.

Figure 9:
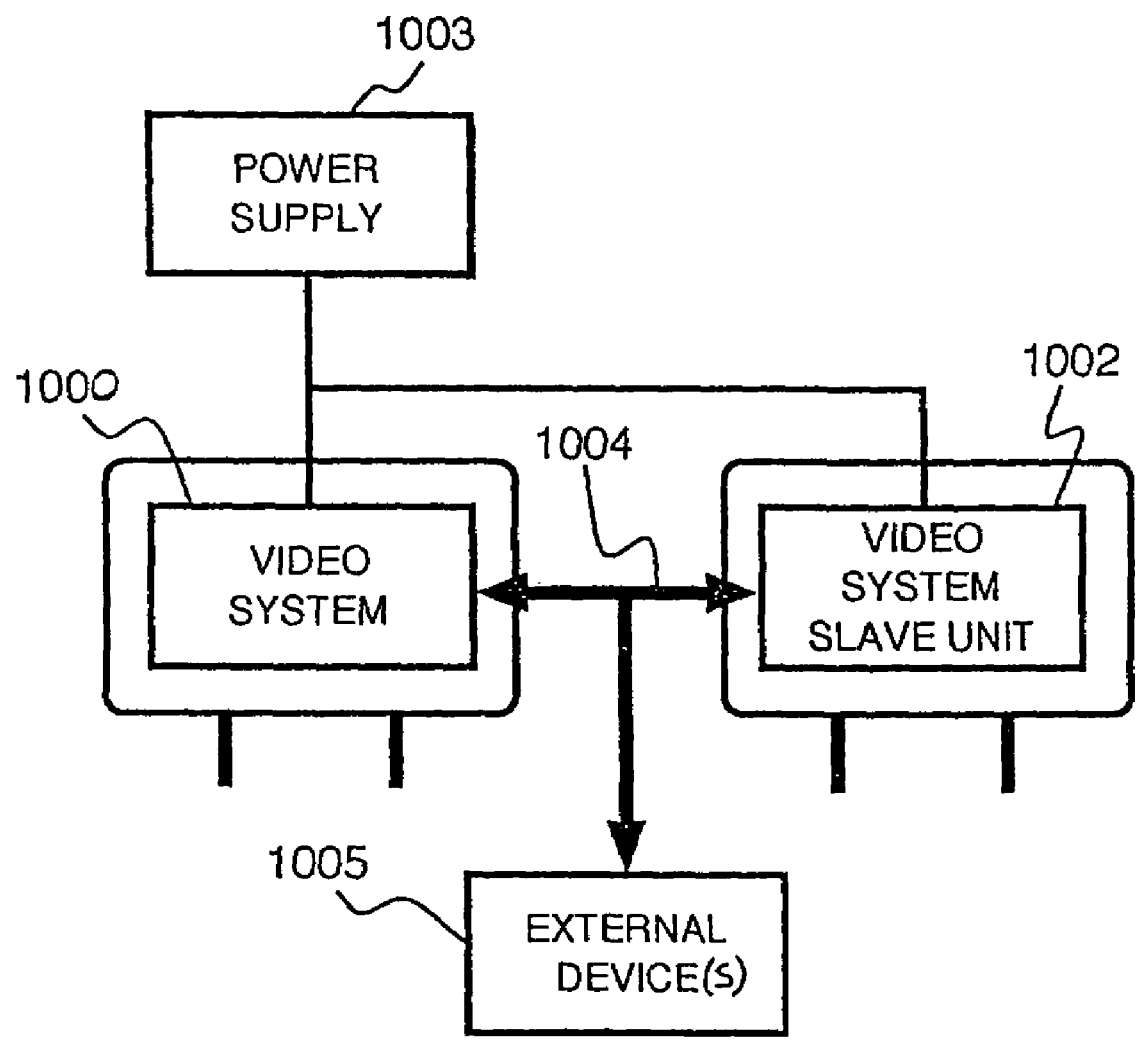
FIG. 9 is a diagram of a system according to an embodiment of the present invention.

Referring now to FIG. 9, a possible configuration of a video system is shown. A video system 1000 and a video slave unit 1002 are connected to a power supply 1003. The video slave unit 1002 receives data to be displayed from the video system 1000 through a data bus 1004. The data bus 1004 can be connected to other devices 1005, such as a vehicle's sound system or a vehicle's navigation system. The connections between the video system 1000 and the external devices 1005 can be a wireless connection (not shown). Similarly, the connection between the video system 1000 and the video system slave device 1002 can be a wireless connection (not shown).

Figure 10A:
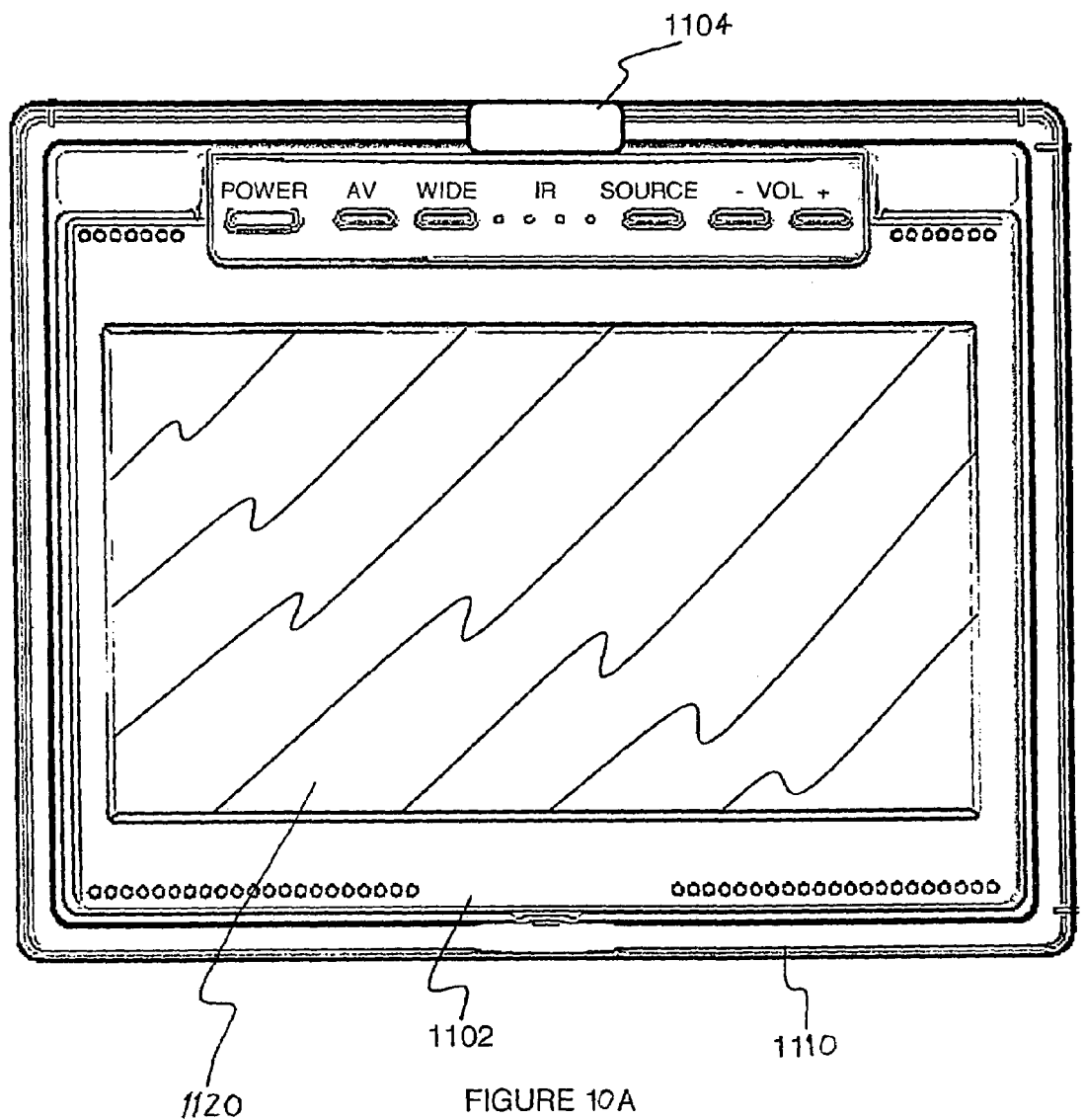
FIGS. 10A and 10B show a video system according to an embodiment of the present invention.
Figure 10B:
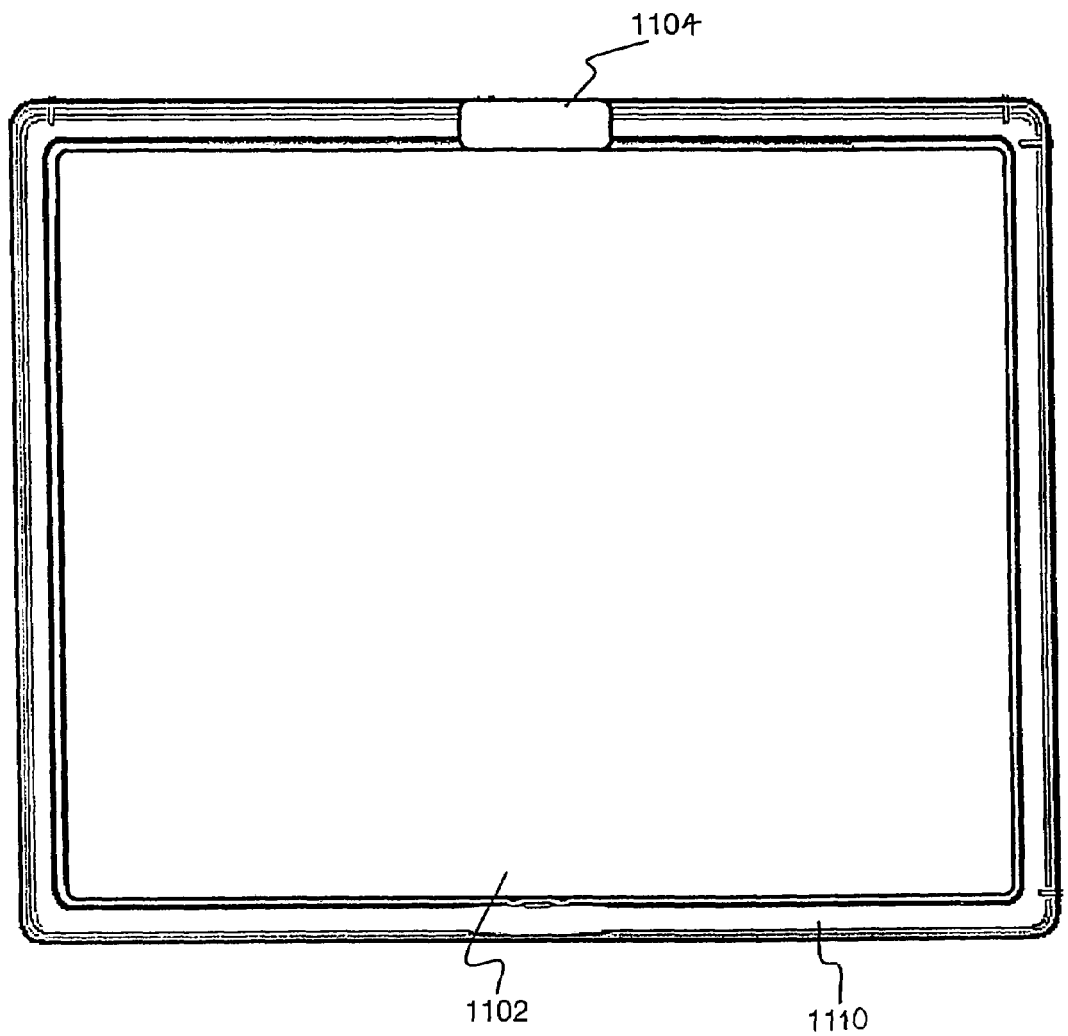

While the video system has been described in terms of a clamshell-type and slot-type devices, the video system can be embodied in other configurations, for example, as a drawer-type device comprising a drawer and a spindle for securing a data media in place. Another example of a video system according to an embodiment of the present invention is a tablet-type device comprising a swivel-hinge 1104 connecting a video screen 1120 to a base portion 1110 as shown in FIGS. 10A and 10B. The swivel-hinge 1104 allows a door 1102 comprising a screen 1120 to move about two axes such that the screen 1120 can be swiveled about the swivel-hinge 1104 and pivoted away from the base 1110 while in an open position. As shown in FIG. 10B, the screen can be turned to face the base portion 1110 when not in use or, as shown in FIG. 10A, turned to face away from the base portion 1110 in a closed viewing position. The swivel-hinge 1104 can be implemented in a slot-type device or a clamshell-type device.

Specifications for the displays may include a TFD color liquid crystal display with a diagonal length of 4-8 inches, preferably 5.8 or 7 inches, and a full color TFT active matrix display. A smaller screen size provides more options for the positioning of components, such as the input/output ports and controls. The dimensions of the video systems to be installed in the headrests, including the base portion, may be approximately 150-250 mm wide, 125-175 mm long and 30-60 mm thick.

Having described embodiments for a headrest mountable video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A video system comprising:
   a base portion mounted in a vehicle seat headrest; and
   a door pivotally attached to the base portion, wherein the door includes a display mounted to the door, and wherein the base portion includes a media player mounted in the base portion such that the media player is behind the door when the door is in a closed position, the base portion including a first opening in line with a slot in the media player, and the headrest including a second opening in line with the first opening for receiving a data media to be inserted into the slot.

2. The video system of claim 1, wherein the base portion is one of coupled to an internal headrest support structure and attached directly to the body of the headrest.

3. The video system of claim 1, further comprising a wireless transmitter for transmitting wireless signals.

4. The video system of claim 3, wherein the wireless transmitter includes at least one of an optical transmitting device and an antenna.

5. The video system of claim 3, wherein the wireless transmitter is capable of transmitting the wireless signals on more than one channel.

6. The video system of claim 3, wherein the wireless signals include at least one of audio signals and video signals.

7. The video system of claim 3, wherein the wireless signals include at least one of infrared (IR) signals and radio frequency (RF) signals.

8. The video system of claim 1, further comprising a port for connecting to an external device.

9. The video system of claim 1, wherein the display is mounted on a front side of the door.

10. The video system of claim 1, further comprising a cover for covering the display.

11. The video system of claim 1, wherein the door is pivotally attached to the base portion with a hinge.

12. The video system of claim 11, wherein the hinge is positioned at a top, bottom or side portion of the door.

13. The video system of claim 1, wherein:
    the display and the media player are capable of operating when the door is in a closed position; and
    the data media is inserted into the media player when the door is in an open or closed position.

14. The video system of claim 1, wherein the vehicle seat headrest includes at least one vent for dissipating heat.

15. The video system of claim 1, wherein the vehicle seat headrest includes a fan.

16. The video system of claim 1, wherein the media player includes at least one of a DVD player, a CD-ROM player, a video game player, a videocassette player, a television tuner, a radio tuner, and a device capable of playing at least one of computerized video files and computerized audio files.

17. The video system of claim 1, wherein the base portion includes a cavity for selectively housing the media player.

18. A video system comprising:
    a base portion mounted in a vehicle seat headrest; and
    a display mounted in the headrest, wherein the base portion includes a media player mounted in the base portion such that the media player is behind the display, the base portion including a first opening in line with a slot in the media player, and the headrest including a second opening in line with the first opening for receiving a data media to be inserted into the slot.

* * * * *